Figure 1:
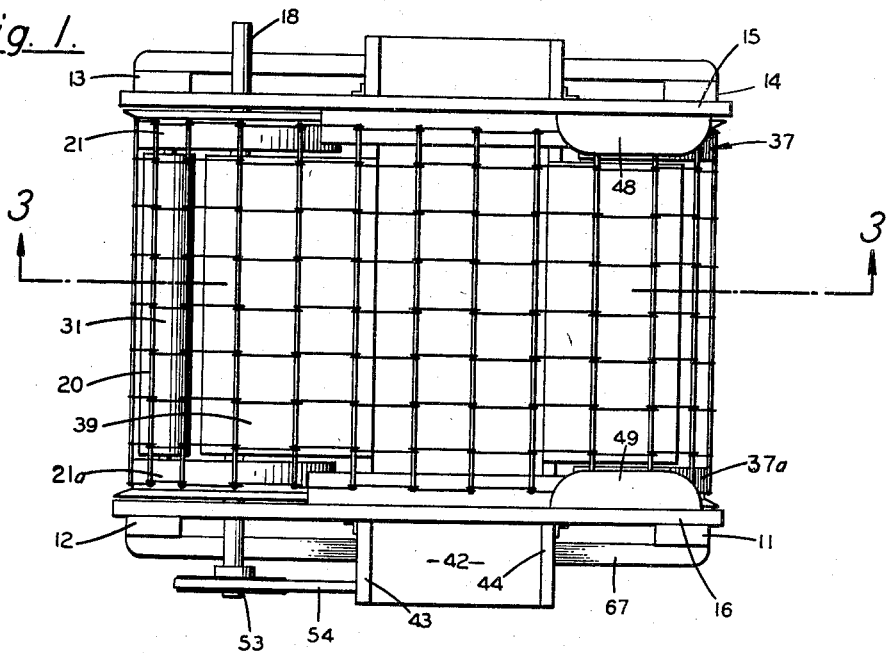

Sept. 24, 1957 D. D. CARDINAL ET AL 2,807,365
MACHINE FOR SORTING OBJECTS ACCORDING TO SIZE
Filed Aug. 31, 1955 3 Sheets-Sheet 1

INVENTOR.
DURAND D. CARDINAL
TRUMAN VICTOR ELLIS
-BY-
ATTORNEY

INVENTOR.
DURAND D. CARDINAL
TRUMAN VICTOR ELLIS
ATTORNEY

United States Patent Office 2,807,365
Patented Sept. 24, 1957

2,807,365

MACHINE FOR SORTING OBJECTS ACCORDING TO SIZE

Durand D. Cardinal and Truman Victor Ellis, Belding, Mich.

Application August 31, 1955, Serial No. 531,654

4 Claims. (Cl. 209—84)

This invention relates to the construction of machines ordinarily used to separate a random mass of fruits or vegetables into groups according to size. It is conventional practice to perform the sorting operation by causing the random mass to move over a screen or conveying belt having a mesh of a particular measurement corresponding to the size of object to be separated out. A group of these machines can be placed in sequence so that each of them will serve to isolate a particular size. It is also a general practice for the sizing belt or screen to serve the function of a conveyor so that the sorting and conveying operation is performed simultaneously. The usual machine of this general type involves a pair of rollers mounted on parallel axes, with provision made for the top or upper flight of the sizing belt to extend between the rollers above a collecting chute or chamber arranged to receive the objects which fall through the mesh of the belt. An example of this type of structure is shown and described in the patent to Fitzgerald, No. 2,152,688.

It is also well known to provide an ejecting system for gently urging the sorted objects out of entrapment in the mesh of the sizing belt. As can readily be imagined, the random mass of objects will contain several which are just slightly in excess of the dimensions which will permit them to fall freely through the sizing openings. The movement of the machine is likely to cause such objects to become rather securely gripped in the mesh, and it is necessary to urge them gently out of engagement to avoid damage to the objects. When the machine is devoted to sorting such fragile items as tomatoes or peaches, the use of a satisfactory ejector is practically a necessity to avoid undue spoilage which would otherwise reach the point that automatic sorting operations became impractical.

This invention utilizes an ejecting roller positioned in such a manner that a considerably greater area for the passage of sorted objects through the mesh of the sorting belt is permitted for a given over-all dimension across the outside of the rollers positioning the sorting belt. Through the use of this invention, a machine may be constructed which utilizes a large drum for positioning a sorting belt without sacrifice of the space between the drums which is normally available to receive the fruit or other objects passing through the mesh. As the objects handled by the sorting machine are carried from the input station, the movement of the belt will involve a general shifting of position of the objects to the point where they are free to drop through. This is particularly true in cases where the objects may be initially deposited on the belt in a depth exceeding one layer. Some time is required for the shifting and positioning to take place, and the movement of the belt is such that a certain length of belt movement is desirable for the sorting operation so that all of the objects which would normally pass through the belt will have adequate time to come into position. The amount of belt length necessary to accomplish this will vary with the type of objects that are being sorted, and also with the way the device is supplied with the random collection of objects in the first place. In any event, it is desirable to minimize the over-all length of the machine for a given acting distance of travel of the sorting portion of the belt. To provide this characteristic, this invention not only utilizes the distance between the rollers which support the belt, but forms the rollers and the ejecting mechanism in such a fashion that the space within the projected cylinders defining the rollers is also utilized. In place of a solid roller for positioning the belt, this invention utilizes axially spaced wheel portions between which a shelf is positioned which is inclined in such a manner as to cause the articles falling through the belt in this area to move centrally toward an ejection trough. An important feature of the invention which permits this construction is the provision of an ejecting roller mounted for rotation on an axis parallel to the belt-positioning roller, and within the space defined by the projected cylinder formed by straight lines connecting the axially-spaced wheel portions. The periphery of the ejection roller is in proximity to the path of the moving belt, and rotates in the same direction at a surface speed preferably greater than that of the belt to create a gentle action urging the entrapped articles out of engagement with the mesh of the belt. Preferably, the ejection roller is covered with a soft material to minimize the amount of damage.

The several features of the invention will be discussed in detail through an analysis of the particular embodiments illustrated in the accompanying drawings. In the drawings:

Figure 1 presents a top view of a machine embodying this invention.

Figure 2:
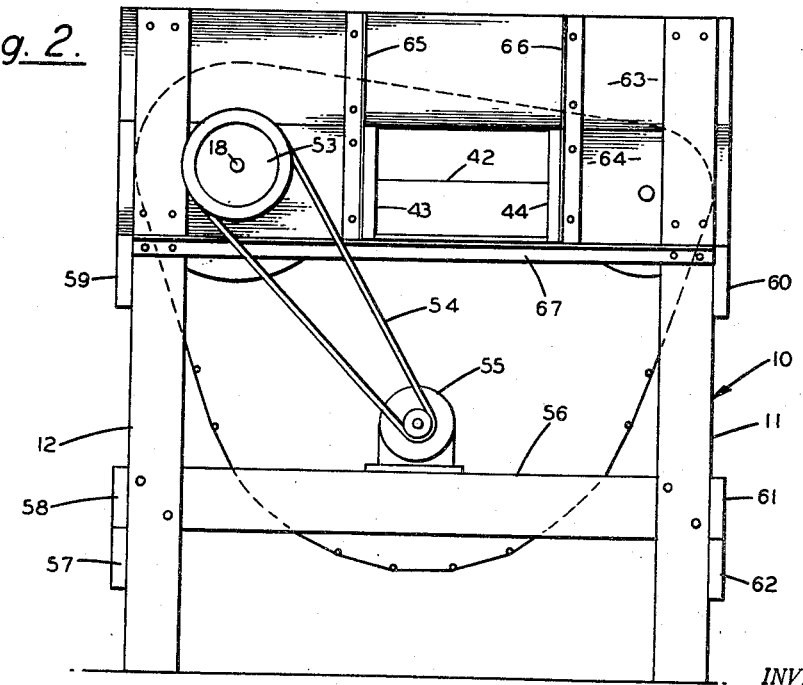

Figure 2 illustrates a side elevation of the machine shown in Figure 1, Figures 1 and 2 being in projection.

Figure 3:
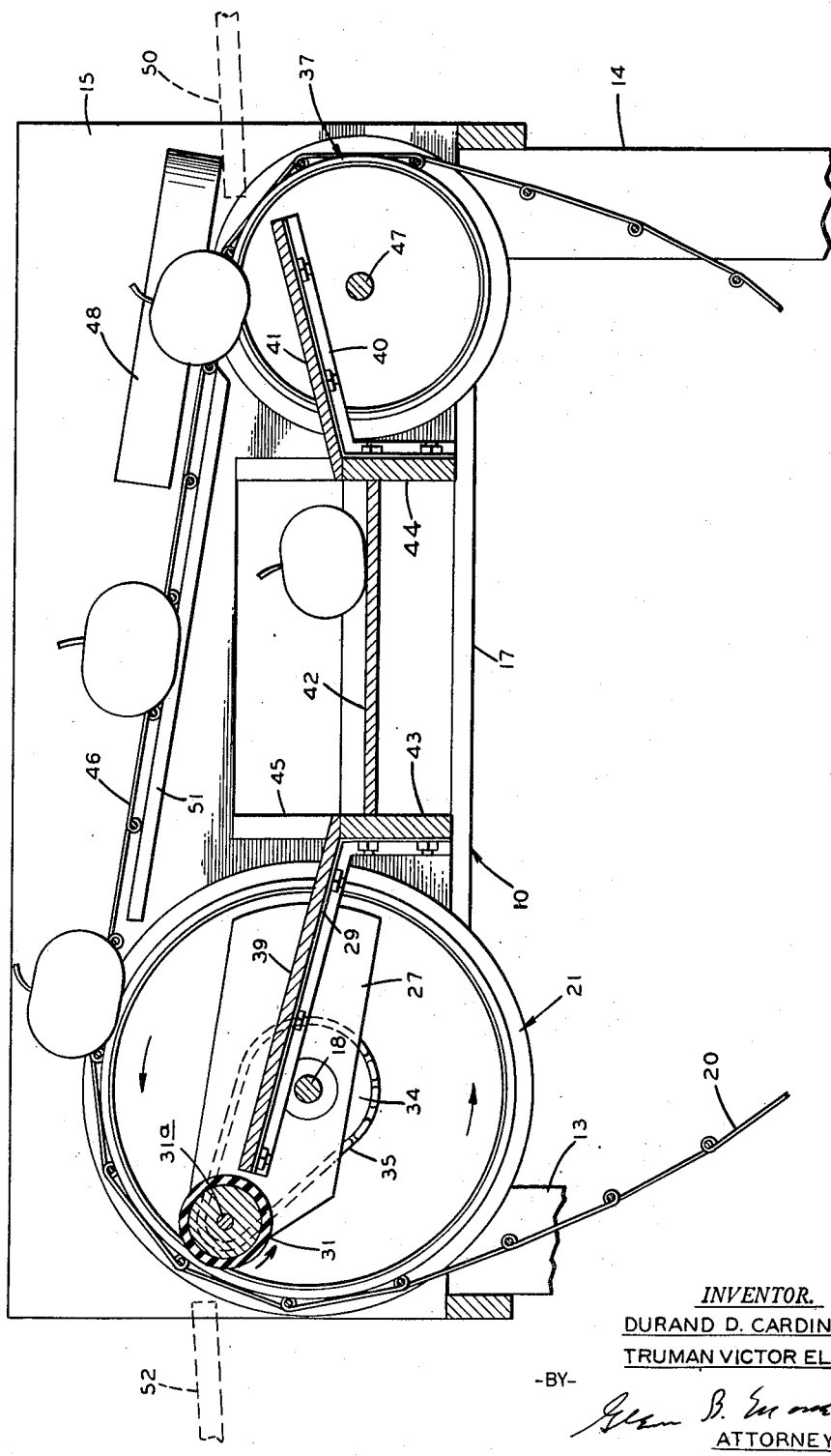

Figure 3 presents a sectional elevation on the plane 3—3 in Figure 1, on an enlarged scale, and showing the action of the sorting machine as it handles apples.

Figure 4:
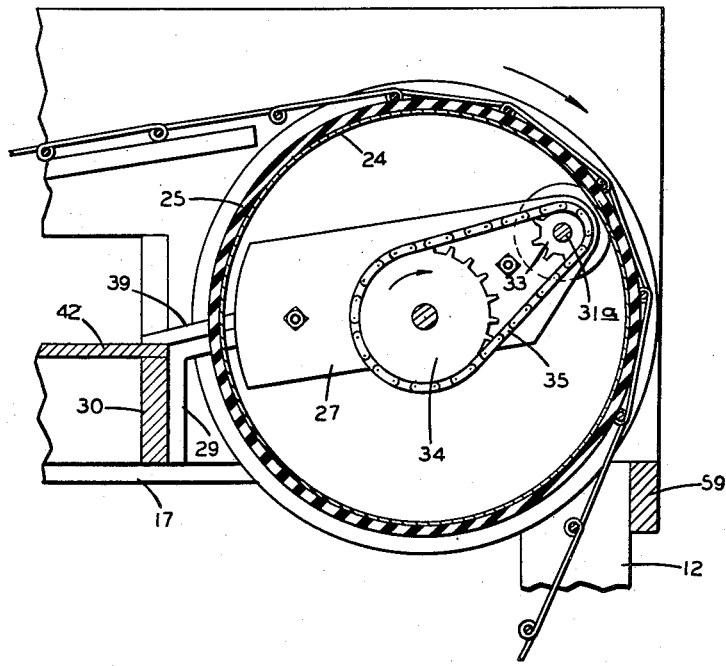

Figure 4 is a fragmentary section showing the structure of the machine, on a plane perpendicular to the axis of the driving and ejection rollers.

Figure 5:
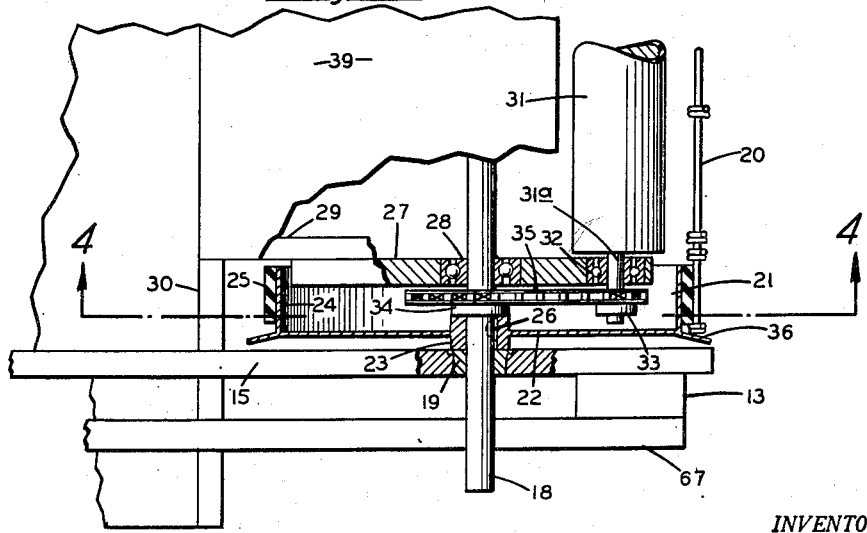

Figure 5 presents a view in projection with Figure 4, and showing a similar fragmentary section from the top.

Referring to the drawings, a frame generally indicated at 10 is formed by legs 11, 12, 13, and 14, the sides 15 and 16, and a bottom panel 17.

The frame may be constructed of wooden boards with the use of conventional fastenings, if desired. Referring particularly to Figure 5, a shaft 18 is rotatably mounted in the sides 15 and 16 of the frame 10 by bearing inserts as indicated at 19. Roller means for supporting the endless sorting chain 20 is formed by the opposite wheel sections generally indicated at 21 and 21a, which are axially spaced from each other. These each include a transverse plate as shown at 22, a hub 23, and a cylindrical rim section 24 covered by a pad of relatively resilient material 25. The hub 23 is locked in relationship to the shaft 18 by a key as shown at 26.

Opposite spaced brackets as indicated at 27 in Figures 3, 4, and 5 are positioned adjacent each of the wheel sections 21 and 22, and are fixed with respect to the frame 10 through the joint action of bearings as indicated at 28 (see Figure 5) and extensions 29 secured to the cross member 30 of the frame 10. In effect, the brackets 27 are positioned primarily by the shaft 18 through the engagement of the bearings 28 therewith, and are prevented from rotating about the shaft by the securing of the extensions 29 to the cross member 30. A disengaging roller 31 is rotatively mounted in bearings as shown at 32 in that portion of the brackets 27 which is within the space defined by a cylinder formed by straight lines connecting the cylindrical portions 24 of the roller members. The axis of rotation of the disengaging roller 31 may be considered as fixed with respect to the frame 10, and the roller shaft 31a continues on the opposite side of the brackets 27 at one end to engage the sprocket 33. A driving sprocket 34 is mounted on the shaft 18, and a chain 35 transfers power from the sprocket 34 to the sprocket 33 to drive the disengaging roller 31 in the same direction of rotation as the wheel portions 21 and 22, at a slightly greater surface velocity than that of the chain 20. It is preferable that the wheel portions also be provided with a flange as indicated at 36 to assist in positioning the sizing chain 20 during the operation of a device.

Referring to Figure 3, another roller member is formed by axially spaced wheel sections 37 and 37a, and is of similar construction to that previously described in connection with the wheel sections 21 and 21a. This portion of the machine, however, is not provided with the ejecting roller 31 and the structure related thereto. An inclined shelf 39 is supported by the bracket extension 29, and a bracket 40 supports a shelf 41 in a similar position between the wheel portions 37 and 37a. The shelves 39 and 41 are inclined toward the central area of the machine to induce articles which fall through the mesh of the belt 20 to move toward the discharge chute 41 positioned between the walls 43 and 44. The shelves 39 and 41, together with the chute 42, may be regarded as receiving means for collecting the sorted objects. It is preferable that the chute 42 be mounted so that it is removable and can be inclined in either direction so as to urge the sorted objects to move outwardly through either of the openings 45 in the sides 15 and 16 depending upon which direction of ejection is desired. In the illustrated structure, the bracket extension 29 and the bracket 40 are formed of the material commonly known as "angle iron" and are secured to the sidewalls 43 and 44, and to the inclined shelves 39 and 41, by bolts or screws as shown.

It is preferable that the diameter of the wheel portions 37 and 37a be less than those of the wheel portions 21 and 21a, or that an attitude of inclination to the upper course 46 of the belt 20 be established by other means such as a variation in the height of the shaft 18 and 47. The upper course 46 of the belt 20 moves to the left as shown in Figure 3, and the upward slant tends to cause piled articles to tumble backward so that they may properly engage the belt rather than being "carried over" without being subject to the sorting operation. Guide blocks as shown at 48 and 49 are also provided to position the objects within the central area of the belt so that the sorting operation can proceed without interference from frictional forces at the sides 15 and 16 or the supporting slats 51. Objects to be sorted are collected on the input ramp or platform shown on dotted lines as 50, from which they are urged into engagement with the upper course 46 of the belt 20. The position of the upper course 46 is stabilized by the presence of the slats 51 arranged in such a position that the weight of the belt can be carried by them rather than resorting to belt tension for this purpose. Slats 51 are positioned at opposite sides of the machine, and are secured to the sides 15 and 16. As the sorted objects are carried by the upper course 46 of the belt 20, the ones of smaller size than the mesh of the belt fall through either onto the shelves 39 or 41, or directly into the chute 42 from which they emerge into a suitable collecting bin (not shown) or lateral conveyor. Those of excessive size are carried by the belt over to the output ramp shown in dotted lines at 52. Articles that have been entrapped in the mesh of the belt 20 are gently urged out of engagement by the roller 31 so that they may continue into the next sorting operation undamaged.

Power is supplied to the shaft 18 through the driving pulley 53 with the belt 54, which also engages the driving pulley of the motor unit 55. The motor is mounted on a lower beam 56 secured to the legs of the frame 10 as shown in Figure 2. Other suitable transverse members may be incorporated in the frame 10 for rigidity, as indicated at 57, 58, 59, 60, 61, and 62. When the sides 15 and 16 are made up of several boards as indicated at 63 and 64 in Figure 2, it is preferable that angle iron braces as shown at 65 and 66 be incorporated to stiffen the central area of the sides adjacent to the openings for the discharge chute. A further angle iron brace is preferably incorporated as shown in 67, on opposite sides of the machine, to support the load equipment associated with the discharge chute.

The particular embodiments of this invention which have been illustrated and described herein are for illustrative purposes only and are not to be considered as a limitation upon the scope of the appended claims. In these claims, it is my intent to claim the entire invention disclosed herein except as I am limited by the prior art.

I claim:

1. A machine for sorting objects according to size, comprising: a frame; a first roller member, said first roller member including coaxial spaced wheel sections rotatably mounted in said frame; a second roller member, said second roller member including coaxial spaced wheel sections rotatably mounted in said frame on an axis parallel to the axis of said first roller member, said second roller member wheel sections being in substantial alignment respectively with said first roller member wheel sections with respect to planes perpendicular to said axes; continuous perforate selecting belt means engaging said first and second roller members; bracket means fixed with respect to said frame and disposed between said first roller member wheel sections and having a portion thereof within the space defined by a cylindrical surface extending between said wheel sections; disengaging roller means rotatably mounted in said bracket means portion on an axis parallel to the axis of said first roller means, siad disengaging roller means extending between said first roller member wheel means and having the periphery thereof disposed within and adjacent said cylindrical surface; receiving means disposed between said first and second roller members and including shelf means disposed between the spaced wheel sections of said first and second roller members respectively, and inclined downwardly toward the central portion of said machine, and also including a discharge chute disposed between said shelf means; drive means for rotating said first roller member; and drive means for rotating said disengaging roller means in the same direction and at a surface velocity slightly greater than that of said first roller member wheel means.

2. A machine for sorting objects according to size, comprising: a frame; shaft means rotatably mounted in said frame; a first roller member, said first roller member including coaxial spaced wheel sections mounted on said shaft; a second roller member, said second roller member including coaxial spaced wheel sections rotatably mounted in said frame on an axis parallel to the axis of said first roller member, said second roller member wheel sections being in substantial alignment respectively with said first roller member wheel sections with respect to planes perpendicular to said axes; continuous perforate selecting belt means engaging said first and second roller members; bracket means fixed with respect to said frame and disposed between said first roller member wheel sections and having a portion thereof within the space defined by a cylindrical surface extending between said wheel sections; disengaging roller means rotatably mounted in said bracket means portion on an axis parallel to the axis of said first roller means, said disengaging roller means extending between said first roller member wheel means and having the periphery thereof disposed within and adjacent said cylindrical surface; receiving means disposed between said first and second roller members and extending into the space between said axially spaced wheel sections; drive means for rotating said first roller member;

and drive means for rotating said disengaging roller means in the same direction and at a surface velocity slightly greater than that of said first roller member wheel means.

3. A machine for sorting objects according to size, comprising: a frame; a first roller member, said first roller member including coaxial spaced wheel sections rotatably mounted in said frame; a second roller member, said second roller member including coaxial spaced wheel sections rotatably mounted in said frame on an axis parallel to the axis of said first roller member, said second roller member wheel sections being in substantial alignment respectively with said first roller member wheel sections with respect to planes perpendicular to said axes; continuous perforate selecting belt means engaging said first and second roller members; bracket means fixed with respect to said frame and disposed between said first roller member wheel sections and having a portion thereof within the space defined by a cylindrical surface extending between said wheel sections; disengaging roller means rotatably mounted in said bracket means portion on an axis parallel to the axis of said first roller means, said disengaging roller means extending between said first roller member wheel means and having the periphery thereof disposed within and adjacent said cylindrical surface; receiving means disposed between said first and second roller members and extending into the space between said axially spaced wheel sections; drive means for rotating said first roller member; and drive means for rotating said disengaging roller means in the same direction and at a surface velocity slightly greater than that of said first roller member wheel means.

4. A machine for sorting objects according to size, comprising: a frame; a first roller member, said first roller member including coaxial spaced wheel sections rotatably mounted in said frame; a second roller member, said second roller member being rotatably mounted in said frame on an axis parallel to the axis of said first roller member, said second roller member being in substantial alignment respectively with said first roller member wheel sections with respect to planes perpendicular to said axes; continuous perforate selecting belt means engaging said first and second roller members; bracket means fixed with respect to said frame and disposed between said first roller member wheel sections and having a portion thereof within the space defined by a cylindrical surface extending between said wheel sections; disengaging roller means rotatably mounted in said bracket means portion on an axis parallel to the axis of said first roller means, said disengaging roller means extending between said first roller member wheel means and having the periphery thereof disposed within and adjacent said cylindrical surface; receiving means disposed between said first and second roller members and extending into the space between said axially spaced wheel sections; drive means for rotating said first roller member; and drive means for rotating said disengaging roller means in the same direction as that of said first roller member wheel means.

References Cited in the file of this patent

UNITED STATES PATENTS

| | | |
|---|---|---|
| 1,438,673 | Trescott | Dec. 12, 1922 |
| 1,636,227 | Grabill | July 19, 1927 |
| 1,968,939 | Grabill | Aug. 7, 1934 |
| 2,153,688 | Fitzgerald | Apr. 11, 1939 |